United States Patent [19]

Hirota

[11] 4,168,176

[45] Sep. 18, 1979

[54] GLASS FOR FARADAY ROTATION ELEMENTS

[75] Inventor: Shinichiro Hirota, Hachioji, Japan

[73] Assignee: Hoya Corporation, Tokyo, Japan

[21] Appl. No.: 889,798

[22] Filed: Mar. 24, 1978

[30] Foreign Application Priority Data

Apr. 7, 1977 [JP] Japan ................................. 52-39739

[51] Int. Cl.$^2$ ........................ C03C 3/16; C03C 3/30; G02B 1/00
[52] U.S. Cl. .............................. 106/47 Q; 106/47 R; 106/54; 252/62.51
[58] Field of Search .................... 106/54, 47 Q, 47 R; 252/301.4 P, 301.4 R, 62.51

[56] References Cited

U.S. PATENT DOCUMENTS

| 3,298,811 | 1/1967 | Kurkjian et al. ................. 106/47 R |
| 3,318,652 | 5/1967 | Berger et al. ..................... 106/47 R |
| 4,075,120 | 2/1978 | Myers et al. ...................... 106/47 Q |

FOREIGN PATENT DOCUMENTS 52-10132  3/1977  Japan .

OTHER PUBLICATIONS

Rawson, H., *Inorganic Glass-Forming Systems*, (1967) Academic Press, NYC, pp. 172-173.

*Primary Examiner*—Helen McCarthy
*Attorney, Agent, or Firm*—Sughrue, Rothwell, Mion, Zinn and Macpeak

[57] ABSTRACT

A stable glass for a Faraday rotation element, the glass comprising, in mole%,
15 to 18% $Ce_2O_3$,
64 to 76% $P_2O_5$,
4 to 16% $B_2O_3$,
0 to 8% $SiO_2$, and
0 to 10% $Al_2O_3$ with 2 to 12% $SiO_2+Al_2O_3$.

1 Claim, No Drawings

GLASS FOR FARADAY ROTATION ELEMENTS

BACKGROUND OF THE INVENTION

1. Field of the Invention

This invention relates to a $Ce^{3+}$-containing glass composition for Faraday rotation elements. Since the glass of this invention is very stable and variations in composition due to volatilization are small as compared with conventional glasses containing $Ce^{3+}$ for Faraday rotation elements, the glass of this invention can be produced easily in high yields.

2. Description of the Prior Art

Heretofore, glasses containing large amounts of paramagnetic rare earth element ions have been used as Faraday rotation elements because of the large Verdet constant of these glasses. Generally, rare earth element oxides other than cerium oxide are very expensive, and there is a great demand for relatively inexpensive glasses containing $Ce^{3+}$ for Faraday rotation glasses. However, conventional $Ce_2O_3$-$P_2O_5$ type glasses disclosed, for example, in Japanese Patent Publication No. 10132/77 (see Nos. 1 and 2 in the table to be given hereinbelow) are very unstable, and tend to devitrify at the time of melt-molding. Furthermore, since the volatilization of $P_2O_5$ from this glass composition is marked, the glass composition tends to vary. Hence, the yield of such glasses is extremely low.

SUMMARY OF THE INVENTION

It has been found that a glass composition of $Ce_2O_3$, $P_2O_5$, $B_2O_3$, $SiO_2$ and/or $Al_2O_3$ exhibits good stability permitting easy melt-molding and reduced volatilization preventing variation in composition and occurrence of striae, and can be produced in a high yield when produced in a large size and a uniform quality.

Accordingly, the present invention provides a glass for a Faraday rotation element which comprises, in mole%, 15 to 18% $Ce_2O_3$,
64 to 76% $P_2O_5$,
4 to 16% $B_2O_3$,
0 to 8% $SiO_2$, and
0 to 10% $Al_2O_3$ with 2 to 12% $SiO_2+Al_2O_3$.

DETAILED DESCRIPTION OF THE INVENTION

The criticality of the amounts of the components of the glass of this invention is described below, all in terms of mole%.

$Ce_2O_3$ is an essential component which is inexpensive and has a large Verdet constant. If the amount of $Ce_2O_3$ is less than 15%, the Verdet constant of the glass decreases, and if the amount of $Ce_2O_3$ exceeds 18%, the glass becomes unstable.

Of the glass-forming oxides, $P_2O_5$ is a principal component for maintaining cerium in the trivalent state. The glass becomes unstable if the amount of $P_2O_5$ is less than 64% or larger than 76%. If the amount of $P_2O_5$ exceeds 76%, volatilization of $P_2O_5$ becomes marked.

$B_2O_3$ exhibits a marked effect in stabilizing the glass if the $B_2O_3$ is used in an amount of at least 4%. But if the amount of $B_2O_3$ exceeds 16%, the glass becomes unstable.

$SiO_2$ stabilizes the glass, but if the amount of $SiO_2$ exceeds 8%, the meltability of the glass is decreased.

$Al_2O_3$ also stabilizes the glass, but if the amount of $Al_2O_3$ exceeds 10%, the glass becomes unstable. $SiO_2$ and $Al_2O_3$ must be present in the glass in a total amount of 2 to 12% so as to stabilize the glass.

Examples of glasses of this invention, Nos. 3 to 19, are described below together with the Verdet constants of these glasses. For comparison, examples of the glass disclosed in Japanese Patent Publication No. 10132/77, Nos. 1 and 2, are shown below. The composition of each glass is expressed in mole%.

| Glass No. | $Ce_2O_3$ | $P_2O_5$ | $B_2O_3$ | $SiO_2$ | $Al_2O_3$ | Verdet Constant at a Wavelength of 6328 A (min/Oe · cm) |
|---|---|---|---|---|---|---|
| 1 | 16 | 80 | — | 4 | — | −0.102 |
| 2 | 16 | 80 | — | — | 4 | −0.110 |
| 3 | 16 | 64 | 16 | 4 | — | −0.105 |
| 4 | 16 | 66 | 8 | — | 10 | −0.105 |
| 5 | 16 | 66 | 8 | 4 | 6 | −0.106 |
| 6 | 16 | 68 | 4 | 8 | 4 | −0.105 |
| 7 | 16 | 68 | 8 | — | 8 | −0.104 |
| 8 | 16 | 68 | 8 | 4 | 4 | −0.105 |
| 9 | 16 | 68 | 8 | 8 | — | −0.106 |
| 10 | 16 | 68 | 10 | 6 | — | −0.107 |
| 11 | 16 | 68 | 12 | — | 4 | −0.106 |
| 12 | 16 | 68 | 12 | 4 | — | −0.107 |
| 13 | 16 | 72 | 4 | — | 8 | −0.102 |
| 14 | 16 | 72 | 4 | 4 | 4 | −0.103 |
| 15 | 16 | 72 | 8 | 4 | — | −0.103 |
| 16 | 16 | 72 | 10 | — | 2 | −0.104 |
| 17 | 16 | 72 | 10 | 2 | — | −0.104 |
| 18 | 16 | 76 | 4 | — | 4 | −0.101 |
| 19 | 18 | 66 | 8 | 4 | 4 | −0.120 |

When these glasses were each melted at 1400° C., quenched, and then maintained at 1150° C. for 1 hour, a marked devitrification of the glass occurred in Glass Nos. 1 and 2, but Glass Nos. 3 to 19 in accordance with this invention were found to be very stable.

The glass of this invention can be produced by melting a mixture of the raw materials, for example, $Ce_2(C_2O_4)_3 \cdot 9H_2O$, $H_3PO_4$, $H_3BO_3$, $SiO_2$ and $Al(OH)_3$, in a platinum crucible at 1350 to 1400° C., and decreasing the temperature gradually with stirring, casting the molten mixture in a pre-heated mold, and annealing the product.

The glass of this invention does not have any tendency to devitrify and can be produced homogeneously in a large size.

While the invention has been described in detail and with reference to specific embodiments thereof, it will be apparent to one skilled in the art that various changes and modifications can be made therein without departing from the spirit and scope thereof.

What is claimed is:

1. A glass for a Faraday rotation element having a high Verdet constant, said glass consisting essentially of, in mole%,
   15 to 18% $Ce_2O_3$,
   64 to 76% $P_2O_5$,
   4 to 16% $B_2O_3$,
   0 to 8% $SiO_2$, and
   0 to 10% $Al_2O_3$ with 2 to 12% $SiO_2+Al_2O_3$.

* * * * *